Patented Apr. 30, 1935

1,999,999

UNITED STATES PATENT OFFICE 1,999,999

BENZANTHRONE SELENOETHERS

Melvin A. Perkins, Milwaukee, Wis., assignor to E. I. du Pont de Nemours & Company, Wilmington, Del., a corporation of Delaware No Drawing. Application December 20, 1933, Serial No. 703,248

6 Claims. (Cl. 260—61)

This invention relates to the preparation of new selenoethers of the benzanthrone series, and more particularly to the preparation of unsymmetrical selenoethers and to a process particularly adapted to the production of either symmetrical or unsymmetrical compounds of this type.

In U. S. Patent 1,924,456, there are described benzanthrone selenoethers which are characterized by two benzanthrone nuclei, substituted or unsubstituted, joined together by one selenium atom. They are formed by heating selenium and a Bz1-halogen-benzanthrone in a solvent, and, due to the method of formation, must possess a symmetrical configuration.

In U. S. Patent 1,965,855, issued July 10, 1934, an improved method for preparing these symmetrical selenoethers is described, wherein Bz1-halogen-benzanthrones are treated with alkali selenides or polyselenides in aqueous alcoholic suspension. By that process, Bz1-benzanthrone-alkali-metal-selenolates are formed as intermediate products of the reaction. The selenolates may, if desired, be isolated as such or they may be oxidized to the corresponding diselenides.

The term "selenols" is used herein to designate those compounds containing the monovalent group —SeH and which, by analogy to the corresponding sulfur compounds, could be called "selenols", hydroselenides or selenophenols. The metal salts of the selenols containing the group —SeMe (Me=a univalent metal such as Na or K) are referred to as selenolates, this nomenclature conforming to that used in naming the corresponding —OMe compounds as phenolates and the —SMe compounds as thiollates.

It is an object of this invention to provide a new and improved process for the preparation of selenoethers of the benzanthrone series, and one which is of wider application than the processes heretofore described. It is a further object to produce new and useful unsymmetrical selenoethers characterized by two dissimilar benzanthrone nuclei being bound together by a selenium atom in the Bz1-position.

According to the present invention, alkali-metal selenolates of benzanthrone or the selenols or diselenides corresponding thereto are condensed with Bz1-halogen-benzanthrones by heating them together in a suitable solvent in the presence or absence of acid binding agents and catalysts. The selenoether is obtained directly in a high degree of purity simply by filtering and freeing it from solvent, acid binding agents, etc. By this processs symmetrical selenoethers are produced when the benzanthronyl-selenolates, selenols or diselenides and the halogen-benzanthrone used are unsubstituted or similarly substituted, while unsymmetrical selenoethers are produced when the two reacting compounds are not similarly substituted.

In carrying out this reaction, the use of approximately molecular proportions of the two reactants is preferred, although an excess of either is not detrimental. In cases where an unsymmetrical ether is to be produced, it is necessary to avoid an excess of the selenolate, selenol or diselenide, since such excess results in a mixture of the desired product with other selenium compounds.

Without any intention of being limited thereby, the following specific examples are given to more fully illustrate the principles of my invention. The parts used are by weight.

Example 1

33.1 parts of Bz1-benzanthrone-sodium selenolate (obtainable from Bz1-halogen-benzanthrone by treatment with alkali-selenide and salting out of the reaction product after filtering off the benzanthronyl-selenide formed as a by-product) and 30.9 parts of Bz1-bromo-benzanthrone are heated in 600 parts of boiling o-dichlorobenzene for about six hours. The end of the reaction is readily ascertained by dissolving a test sample of the reaction product in concentrated sulfuric acid, whereupon a greenish-blue color indicates completion. The original materials together give a reddish-violet solution in sulfuric acid. When there is no further reaction, the mass is cooled somewhat, filtered while still warm to remove small quantities of impurities, and the residual solid is washed first with a suitable solvent such as alcohol, then with water, and dried. There is thus obtained in excellent yields, a brownish-yellow solid which gives an intense greenish-blue coloration in sulfuric acid. Upon recrystallization from nitrobenzene, characteristic yellow needles of Bz1, Bz1'-benzanthronyl-selenide (M. P. 336-7° C.) are obtained.

Example 2

6 parts of Bz1, Bz1'-benzanthronyl-diselenide (M. P. about 240° C., made by air oxidation of a Bz1-benzanthrone - sodium - selenolate solution) and 6 parts of Bz1-bromo-benzanthrone ar suspended or dissolved in 120 parts of o-dichlorobenzene. 2 parts of anhydrous sodium acetate are added and the whole heated to reflux for about 10 hours. At the end of this time a test sample shows a bluish-violet to blue coloration when dissolved in sulfuric acid. The reaction mixture is then cooled to about 60° C., filtered, and washed with o-dichlorobenzene, alcohol, and water in the order named. Thus there is obtained a yellow-brown solid which gives an intense green-blue coloration in sulfuric acid. The yield is from 8 to 9 parts, showing that there must be actual condensation between the bromo-benzanthrone and the diselenide.

Example 3

If, in Example 2, 5.2 parts of Bz1-chloro-benzanthrone (M. P. 180° C.) is used in place of 6 parts of Bz1-bromo-benzanthrone, a similar result is obtained, although somewhat longer time of reaction is advisable in order to realize best yields. The product obtained is identical with that of Examples 1 and 2.

Example 4.—Preparation of an unsymmetrically substituted Bz1, Bz1'-benzanthronyl-selenide 6 parts of 6, Bz1-dibromo-benzanthrone (M. P. 257° C.) and 45 parts of Bz1, Bz1'-benzanthronyl-diselenide are slurried in 100 parts of o-dichlorobenzene. 1.5 parts of anhydrous sodium acetate are added and the whole heated to reflux for about 10 hours, whereupon a rich yellow-brown melt is obtained. Upon cooling slightly and filtering, there is obtained in high yield a yellow-brown solid which gives a greenish-blue coloration in sulfuric acid.

Example 5

7.4 parts of Bz1-bromo-Bz2-acetamino-benzanthrone (prepared for example by brominating Bz2-acetamino-benzanthrone-M. P. 265° C.—in glacial acetic acid), 6.2 parts of Bz1, Bz1'-benzanthronyl-diselenide and 2 parts of anhydrous sodium acetate are stirred into 80 parts of molten naphthalene, and the mixture heated at the boil for about 15 hours. At the end of this time the mass is cooled slightly, drowned in solvent naphtha, filtered and the residue washed with alcohol and water to remove salts. There is thus obtained a yellow-brown solid which dissolves in sulfuric acid, giving a violet-brown coloration, does not vat, but when heated with alcohol and potassium hydroxide gives a greenish-blue melt. Upon dilution and vatting, a dark blue vat is obtained from which cotton is dyed blue shades which become bluish-gray upon rinsing and drying the fiber. This mono-acetylamino substituted compound differs materially from the unsubstituted Bz1, Bz1'-benzanthronyl-selenide, which gives a violet dye upon fusion.

Example 6

10 parts of amino-Bz1-chloro-benzanthrone (made by reduction of the nitro-Bz1-chloro-benzanthrone obtained by nitration of Bz1-chloro-benzanthrone in sulfuric acid with one equivalent of concentrated nitric acid), 11 parts of Bz1, Bz1'-benzanthronyl-diselenide, 0.1 part of copper powder and 5 parts of calcium hydroxide are stirred at ordinary temperature into 120 parts of tetrahydronaphthalene. The mixture is then heated to reflux (200–205° C.) until a test portion dissolves in sulfuric acid with a green coloration. (The initial materials together give a red-violet coloration in sulfuric acid.) This requires from 5 to 8 hours. After cooling, the thick brownish mass is filtered, and the residual solid washed, first with solvent naphtha, then with alcohol and finally with hot dilute hydrochloric acid. The monoamino-Bz1, Bz1'-benzanthronyl-selenide is obtained in excellent yield as a brownish solid which dissolves in sulfuric acid with an intense moss-green color, and which yields upon fusion in alcoholic caustic potash a blue-violet dyestuff which dyes cotton from a reddish-blue vat blue-violet shades, which by the action of chlorine are converted to reddish-navy blue shades.

Example 7

6.5 parts of Bz1-benzanthrone-sodium selenolate plus salt (containing 4.5 parts of 100% selenolate), and 4.0 parts of Bz1, Bz2-dichloro-benzanthrone (M. P. 250–254° C. and obtained by diazotization of Bz1-amino-Bz2-chloro-benzanthrone, followed by treatment with cuprous chloride solution) are introduced into 100 parts of trichlorobenzene and the mass heated to reflux until a test portion gives a blue-violet coloration in sulfuric acid. After cooling, the brownish solid is filtered off and washed with alcohol and water. The monochloro-Bz1, Bz1'-benzanthronyl selenide thus obtained gives a blue-violet coloration in sulfuric acid solution and fuses in alcoholic caustic potash to give an intense blue melt. After dilution and vatting, a violet-blue vat is obtained from which cotton is dyed in strong violet shades similar to those produced by isodibenzanthrone.

Example 8

30 parts of 6-amino-Bz1-chloro-benzanthrone (made, for example, by reduction of the nitro-Bz1-chloro-benzanthrone—M. P. 282° C.—produced by nitration of Bz1-chloro-benzanthrone in nitrobenzene by means of fuming nitric acid), 33 parts of Bz1, Bz1'-benzanthronyl-diselenide and 15 parts of sodium bisulfite are introduced into 600 parts of high boiling kerosene and the mixture heated to 185–190° C. for several hours, until a test portion gives a bluish-green coloration when dissolved in sulfuric acid. The reaction mass is then cooled slightly and filtered. The solid may be freed from kerosene by a suitable method, for instance, by steaming of the cake and subsequent filtration. The brownish solid thus obtained is very similar to the monoamino-Bz1, Bz1'-benzanthronyl-selenide obtained as in Example 6. Its solution in sulfuric acid possesses an intense moss-green color and fusion with alcoholic caustic potash yields a blue melt. The dyestuff resulting has a reddish-blue vat and dyes cotton very blue shades of violet somewhat similar to those produced by dibenzanthrone.

According to the present invention, diselenides are convertible into valuable selenoethers which yield isoviolanthrone or derivatives thereof upon fusion. It furthermore provides a method for preparing unsymmetrical substitution products of Bz1, Bz1'-benzanthronyl-selenide which it is difficult or impossible to obtain by other methods.

When the benzanthronyl-selenolate is used in the reaction, the addition of acid binding agents is of course not necessary, since the alkali-metal present in the selenolate is sufficient to take up the halogen liberated in the reaction. With the diselenide or selenol the use of an acid binding agent is preferred. Although not an essential in carrying out this reaction, a catalyst may be employed when desired. Any solvent may be used which will dissolve at least one of the reactants and which will itself not enter into the reaction under the conditions used. The potassium selenolates may be substituted for the sodium salts used in the above examples.

In the following claims, the terms "a Bz1-halogen-benzanthrone", "a Bz1-benzanthronyl-selenolate" or "a Bz1-benzanthronyl-selenol", and "a Bz1, Bz1'-benzanthronyl-diselenide" are used to indicate these compounds in either the substituted or unsubstituted form.

I claim:

1. In the preparation of benzanthronyl selenoethers, the step which comprises heating a Bz1-halogen-benzanthrone compound with a compound of the group consisting of a Bz1-benzanthronyl-selenolate, a Bz1-benzanthronyl-selenol, and a Bz1, Bz1'-benzanthronyl-diselenide.

2. In the preparation of benzanthronyl selenoethers, the step which comprises heating a Bz1-halogen-benzanthrone compound with a compound of the group consisting of a Bz1-benzanthronyl-selenolate, a Bz1-benzanthronyl-selenol, and a Bz1, Bz1'-benzanthronyl-diselenide in the presence of a solvent.

3. In the preparation of benzanthronyl selenoethers, the step which comprises heating a Bz1-halogen-benzanthrone compound with an alkali-metal-Bz1-benzanthronyl-selenolate in the presence of a solvent.

4. In the preparation of benzanthronyl selenoethers, the step which comprises heating a Bz1-halogen-benzanthrone compound with a Bz1, Bz1'-benzanthronyl-diselenide in the presence of an acid binding agent and a solvent for at least one of the reactants.

5. In the preparation of benzanthronyl selenoethers, the step which comprises heating a Bz1-halogen-benzanthrone compound with a Bz1-benzanthronyl-selenol in the presence of an acid binding agent and a solvent for at least one of the reactants.

6. An unsymmetrical Bz1, Bz1'-benzanthronyl-selenoether.

MELVIN A. PERKINS.